United States Patent [19]

Cockerell

[11] 4,098,084
[45] Jul. 4, 1978

[54] APPARATUS FOR EXTRACTING ENERGY FROM WAVE MOVEMENT OF THE SEA

[75] Inventor: Christopher Cockerell, Southampton, England

[73] Assignee: Wavepower Limited, Southampton, England

[21] Appl. No.: 678,863

[22] Filed: Apr. 21, 1976

[30] Foreign Application Priority Data

Apr. 28, 1975 [GB] United Kingdom ............... 17597/75

[51] Int. Cl.² ................................................. E02B 9/08
[52] U.S. Cl. ........................................ 60/500; 60/501; 417/332
[58] Field of Search ................... 60/499–502, 60/505, 506; 417/330–333; 290/53

[56] References Cited

U.S. PATENT DOCUMENTS

| | | | |
|---|---|---|---|
| 879,992 | 2/1908 | Wilson | 417/331 |
| 901,117 | 10/1908 | McManus | 60/505 X |
| 3,758,788 | 9/1973 | Richeson | 60/500 X |

Primary Examiner—Allen M. Ostrager
Assistant Examiner—Stephen F. Husar
Attorney, Agent, or Firm—McNenny, Pearne, Gordon, Gail, Dickinson & Schiller

[57] ABSTRACT

This invention relates to apparatus for extracting energy from movement of water, particularly sea waves, the apparatus comprising a plurality of buoyant members which are interconnected one with another so as to be movable relative to one another, each buoyant member being provided with a plate or plate-like member which is supported from the buoyant member and positioned so that in use of the apparatus it is submerged below the level of the water, and means are provided for converting the relative movement of the buoyant members into useful energy, such as electricity.

18 Claims, 31 Drawing Figures

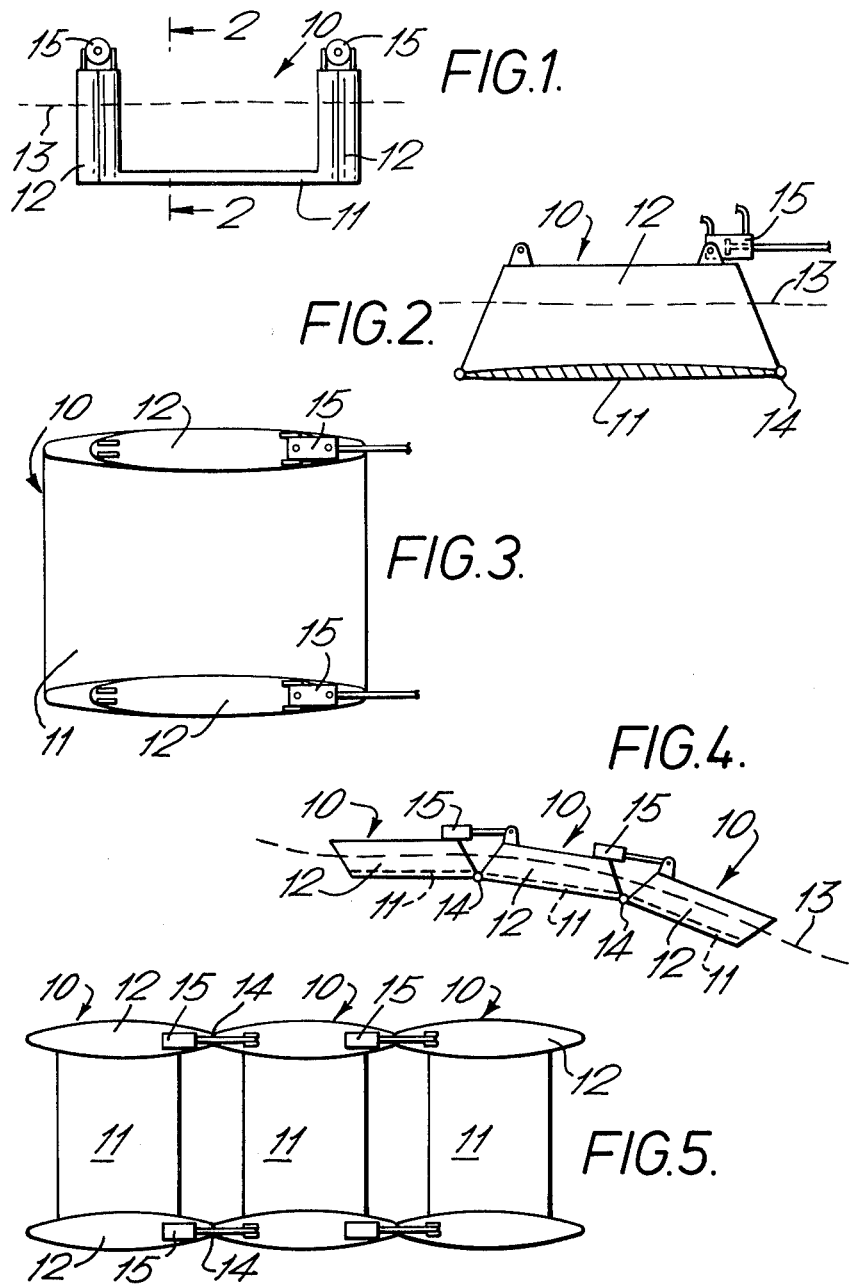

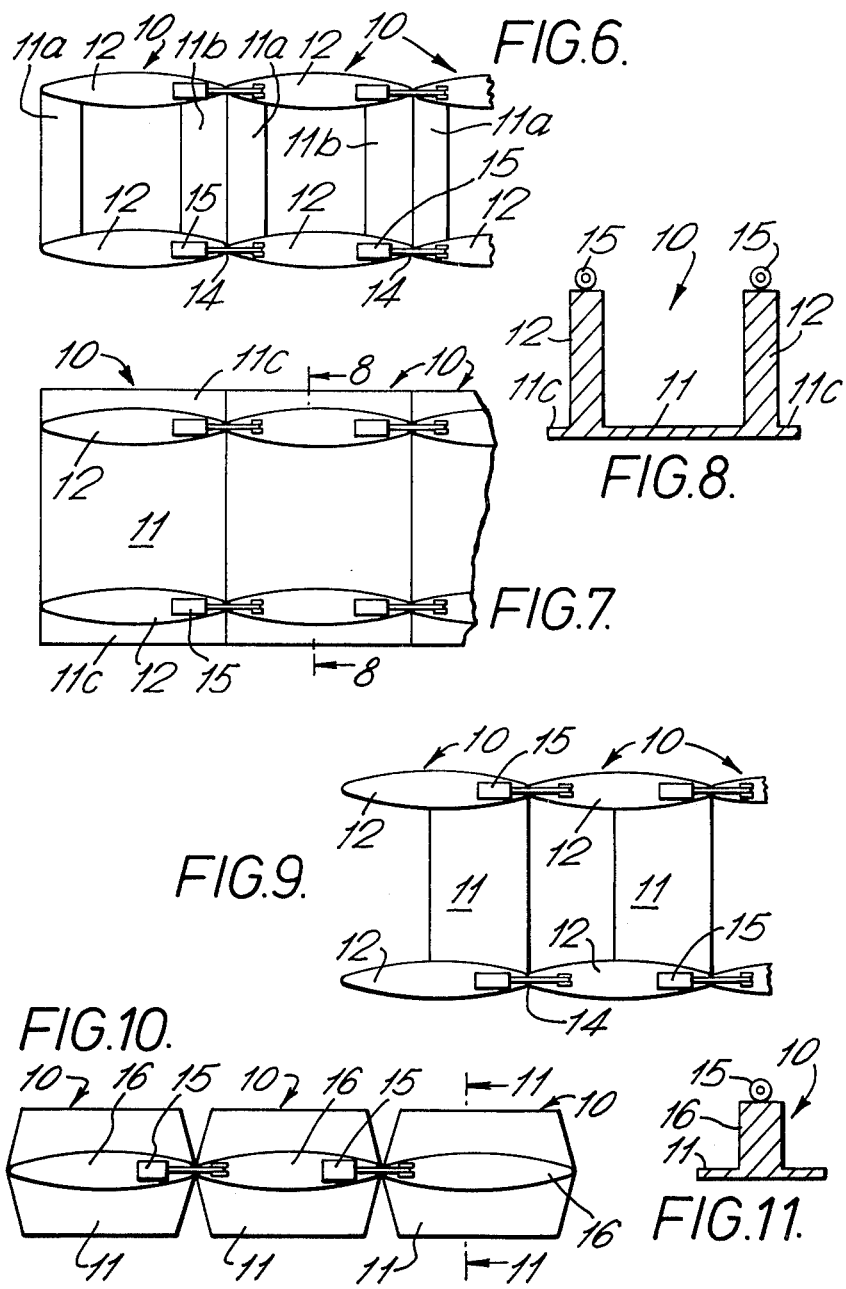

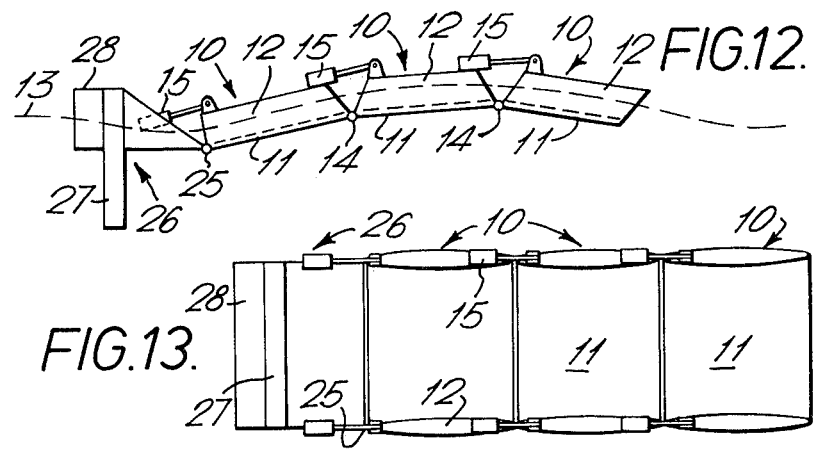
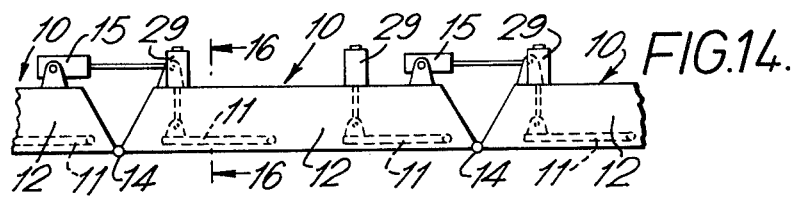
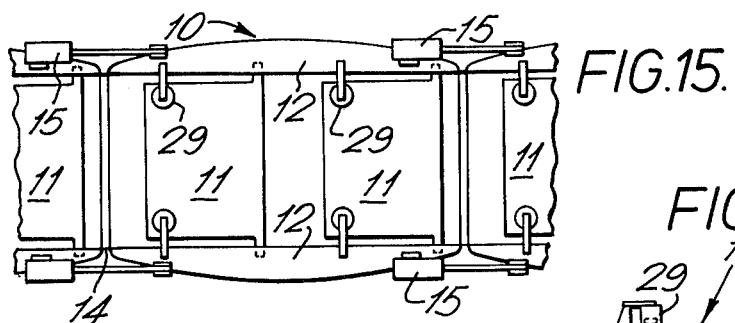
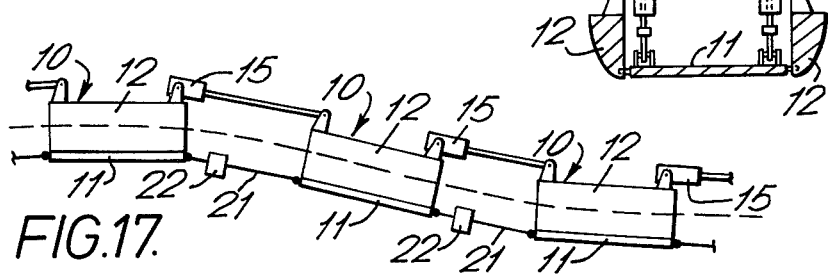

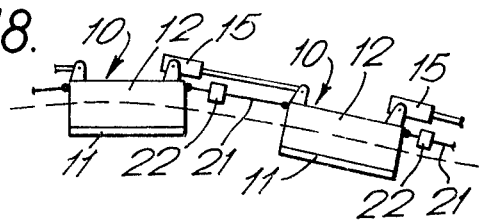
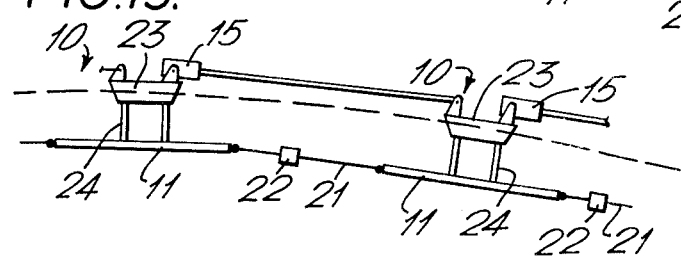
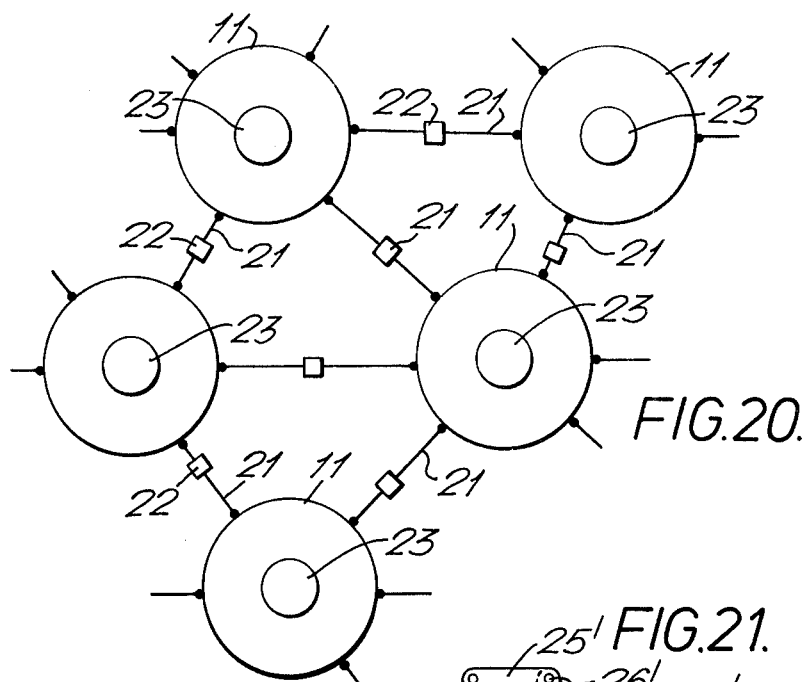
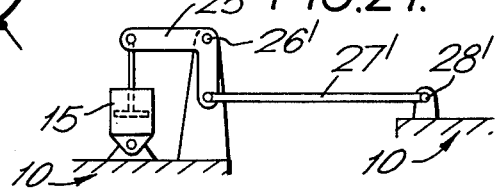

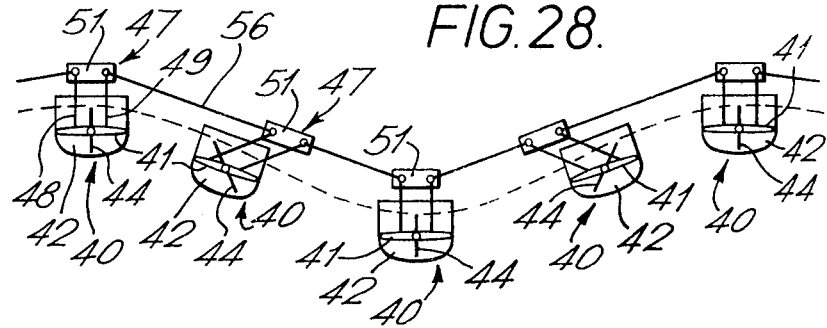
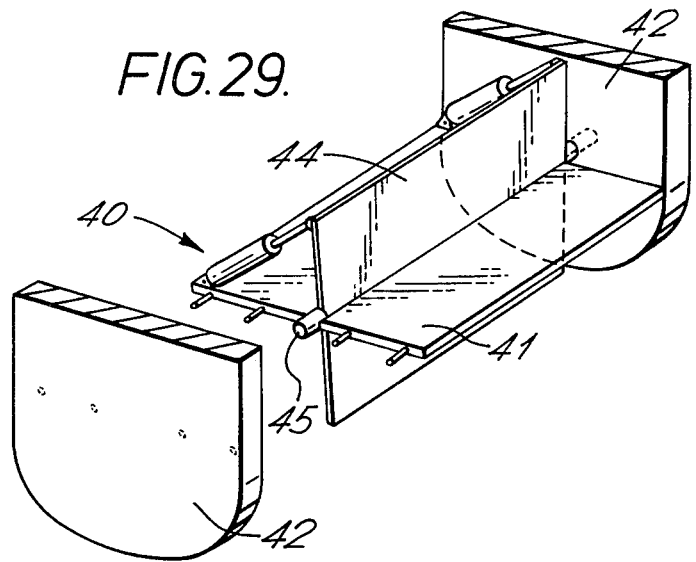

4,098,084

APPARATUS FOR EXTRACTING ENERGY FROM WAVE MOVEMENT OF THE SEA

BACKGROUND OF THE INVENTION

This invention relates to apparatus for extracting energy from movement of water, preferably sea waves and sea currents and for converting the extracted energy into useful energy, such as electricity.

Various forms of apparatus are known having a movable member which is moved by sea waves relative to a fixed structure and whose movement is converted into usable energy. The fixed structure is usually mounted on the sea bed and this produces vast engineering problems and difficulties. It also means that such apparatus cannot be used in great depths of water.

SUMMARY OF THE INVENTION

This invention relates generally as indicated to apparatus for extracting energy from movement of water, preferably sea waves and sea currents and for converting the extracted energy into useful energy, such as electricity.

An object of the present invention is to provide apparatus which is buoyant and can be moored by cable and the like using conventional mooring techniques.

Another object of the invention is to provide apparatus for extracting energy from the heave, surge and movement of water particles within a wave.

According to the present invention there is provided apparatus for extracting energy from movement of water, comprising a plurality of buoyant members which are interconnected one with another so as to be movable relative to one another, each buoyant member being provided with a plate or plate-like member supported from the buoyant member and positioned so as to be submerged below the level of the water in use of the apparatus, and means for converting the relative movement of the buoyant members into useful energy.

BRIEF DESCRIPTION OF THE DRAWINGS

To the accomplishment of the foregoing and related ends, the invention then comprises the features hereafter fully described and particularly pointed out in the claims, the following description and annexed drawings setting forth in detail certain illustrative embodiments of the invention, these being indicative however of only some ways in which the principle of the invention may be employed.

In said annexed drawings:

FIG. 1 is an end view of a buoyant member which can be used in apparatus according to the present invention, FIG. 2 is a section taken along the line 2—2 indicated on FIG. 1, FIG. 3 is a plan view of the member shown in FIGS. 1 and 2, FIG. 4 is a side elevation of a plurality of such members interconnected to form an embodiment of apparatus according to the present invention, FIG. 5 is a plan view of the same embodiment of apparatus provided with modified members, FIG. 6 is a plan view of the same embodiment of apparatus provided with further modified members, FIG. 7 is a plan of the same embodiment of apparatus provided with still further modified members, FIG. 8 is a section taken along the line 8—8 indicated on FIG. 7, FIG. 9 is a plan view of the same embodiment of apparatus provided with yet further modified members, FIG. 10 is a plan view of the same embodiment of apparatus provided with even further modified members, FIG. 11 is a section taken along the line 11—11 indicated on FIG. 10, FIG. 12 is a side elevation of the same embodiment of apparatus according to the present invention provided with a reflector plate at one end, FI. 13 is a plan view of the apparatus shown in FIG. 12, FIG. 14 is a side elevation of an embodiment of apparatus according to the present invention, FIG. 15 is a plan view of the apparatus shown in FIG. 14, FIG. 16 is a section taken along the line 16—16 indicated on FIG. 14, FIG. 17 is a side elevation showing a plurality of members interconnected by variable length linkages, FIG. 18 shows a modification of the apparatus shown in FIG. 17, FIG. 19 is a side elevation showing another embodiment of members connected together by variable length linkages, FIG. 20 is a plan view of the apparatus shown in FIG. 19, FIG. 21 is a side view of a member for producing pressure pulses, FIG. 28 is a side elevation of a further embodiment of apparatus, FIG. 29 is a diagrammatic perspective view of a buoyant member of the apparatus of FIG. 28.

DESCRIPTION OF THE PREFERRED EMBODIMENTS

Figure 22:
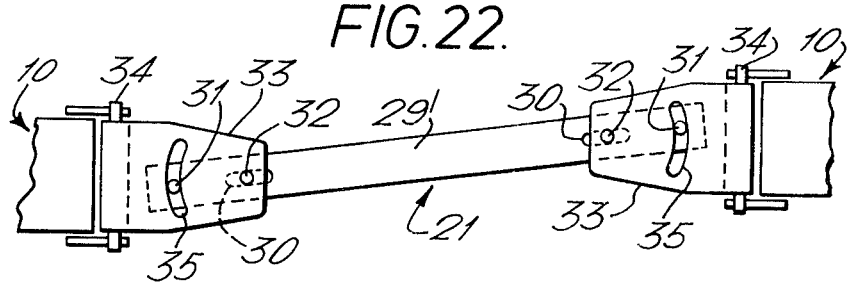
FIG. 22 is a side view of one form of variable length linkage.

FIGS. 1 to 3 illustrate a buoyant member 10 which comprises a plate 11 which in longitudinal section is shown as having curved upper and lower surfaces but the plate 11 may be provided with flat upper and lower surfaces. The thickness of the plate 11 is kept to a minimum so as not to form an obstruction to the flow of water. At each side of the plate 11 are provided upstanding walls 12 which are buoyant and which support the plate 11 so that in use it is below the level of the water 13. The side walls 12 are shown as having curved sides but the sides may be straight if desired. As shown in FIG. 4 the apparatus comprises a plurality of such buoyant members 10 which are connected together in end to end relationship by hinges 14 and the adjacent side walls 12 of adjacent members 10 are interconnected by hydraulic or pneumatic piston and cylinder devices 15 which transmit pressure pulses produced by relative movement of the members 10 to means (not shown) from which energy can be extracted for use or to means (not shown) which utilises the pressure pulses direct. For example such an apparatus positioned off-shore can be used to pump water to a reservoir and the reservoir used for powering a shore based hydro-electric installation. The piston and cylinder devices 15 may be replaced by another suitable means which is capable of converting the relative movement of the members 10 into useful energy, such means may comprise mechanical means for driving a genertor for producing electricity. The plates 11 together form a substantially continuous lower surface to the apparatus. The end members 10 of the apparatus are provided with a bow shape. In use of the apparatus shown in FIG. 4 the members 10 will be moved relative to one another by heave movements of a wave and thus the devices 15, which will be double-acting, will continuously produce pressure pulses which can be transmitted to the shore based installation or used directly to drive electrical generators.

In the modified arrangement shown in FIG. 5 the plates 11 of the members 10 do not extend to the forward and rearward edges of the side walls 12 as in the previous embodiment.

FIG. 6 shows a further modification in which the plate 11 is formed by two spaced apart plates 11a and 11b.

FIGS. 7 and 8 show members 10 in which the plate 11 extends at 11c beyond the outer side of the side walls 12. Alternatively the extensions 11c may be formed separately from the plates 11. All of the previously described embodiments of members 10 may be modified in this manner.

The members 10 shown in FIG. 9 each have a single plate 11 which is positioned at the forward end of the side walls 12. This embodiment may also include the extension 11c as in FIGS. 7 and 8.

FIGS. 10 and 11 show an embodiment in which each member 10 has a plate 11 provided with a single upstanding buoyant wall 16. The plate 11 may extend for the whole length of the wall 16 as shown or for only a proportion of the length similar to those shown in FIG. 5 or FIG. 9 or the plate 11 may be formed by two spaced apart plates similar to those shown in FIG. 6. The embodiment of FIG. 10 enables the plates 11 to be moved by the wave energy acting over the width of the apparatus augmented by new energy which flows in from outside of the area of the apparatus as the energy from the wave front is extracted. Buoyant members 10 of the type shown in FIGS. 10 and 11 may be connected to and alternated with buoyant members 10 having two end walls as in FIGS. 1 to 9.

An end member 10 in all of the embodiments shown in FIGS. 1 to 11 may be pivoted at 25 to a reflector member 26 as shown in FIGS. 12 and 13. The member 26 is provided with a vertical plate 27 provided with buoyancy 28 and the plate 27 extends into the water to form a reflector for reflecting the wave front in a reverse direction so that further energy can be extracted by the apparatus. The reflector member 26 is movable relative to the end member 10 and means are provided to convert this movement into useful energy. The reflector member 26 is moved by the surge motion of a wave.

FIGS. 14 to 16 show an embodiment in which each member 10 has a pair of plates 11 pivoted thereto. Alternatively a single pivotable plate 11 or more than two pivotable plates 11 may be provided. Each pivotable plate 11 is connected to a double-acting hydraulic or pneumatic device 29 or to a mechanical means. In this embodiment the inner sides of the walls 12 are straight and the outer sides curved longitudinally and vertically. Obviously the outer sides of the walls may be curved only in one plane or may be straight.

In all of the embodiments described, where the distance between the side walls 12 of a member 10 or the distance between side walls 17 is considerable, the plates 11, 18, 21 may be supported along their length by means connected to support structure extending above them and extending between the walls 12.

In the embodiments described above there is illustrated a single row of interconnected members 10 but the apparatus may comprise two or more rows of interconnected members 10.

In connecting the buoyant members 10 together it may be necessary to include in the connecting linkages means to allow the linkages to expand and contract, i.e., to effectively increase or decrease in length so that the stresses in the elements of the apparatus is reduced.

FIG. 17 shows a diagrammatic side elevation of a plurality of members 10 in which the plates 11 are interconnected by linkages 21 provided with means 22 which enable the linkage 21 to expand or contract in length. Such means 22 may be pneumatic or hydraulic or mechanical. Alternatively as shown in FIG. 18 the walls 12 may be interconnected by such linkages 21 and means 22.

FIGS. 19 and 20 show an apparatus according to the present invention in which each member 10 consists of a circular plate 11 supported, in this embodiment, from a circular buoyant member 23 by small diameter support rods 24. The rods 24 may be replaced by any suitable support structure or by a solid buoyancy member. The plates 11 of the members 10 are interconnected by linkages 21 provided with said means 22. Such linkages 21 may be arranged in a triangular configuration as shown. Like in FIG. 21 the linkages 21 may extend between the members 23 instead of between the plates 12. It will be appreciated that a plurality of chains of devices as shown in any of the previous embodiments can be linked together to form apparatus which in plan view configuration is similar to that of FIG. 23.

Apparatus as shown in FIGS. 19 and 20 can extract energy from sea waves which reach the apparatus from any direction.

If desired, the devices 15 can be connected to the adjoining member 10 by a simple lever system as shown in FIG. 21. In this Figure the piston of device 15 is connected to one arm of a bellcrank lever 25 pivoted at 26 to one member 10, the other arm of the lever 25 being connected to a rod 27 connected at 28 to an adjacent member 10.

Figure 23:
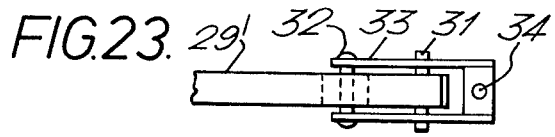
FIG. 23 is a plan view of the linkage shown in FIG. 22.

Each linkage 21 may be as illustrated in FIGS. 22 and 23, and consist of a link 29 provided at each end with a longitudinaly extending slot 30 and a pin 31. Each slot 30 engages with a pin 32 provided on a member 33 which is hinged at 34 to a member 10. The member 33 is provided with an arcuate slot 35 in which the pin 31 is received. It will be appreciated that as the pins 31 are moved from one extremity of the associated slot 35 towards the mid-length region of the slot 35 due to the relative movements of the elements the effective length of the linkage can be arranged to decrease and as the pins 31 move towards the extremities of the slots 35 the effective length of the linkage can be arranged to increase.

Figure 24:
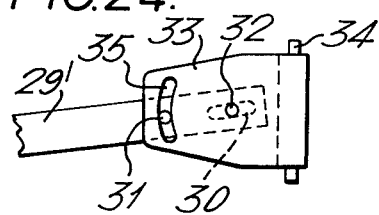
FIG. 24 is a side view of another form of variable length linkage.
Figure 25:
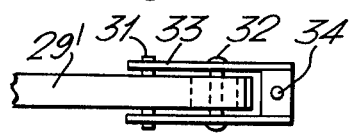
FIG. 25 is a plan view of the linkage shown in FIG. 24.

FIGS. 24 and 25 show a linkage in which the slots 35 and associated pin 31 are positioned on the other side of the slots 30 and pins 32 as compared with the previous Figures.

Figure 26:
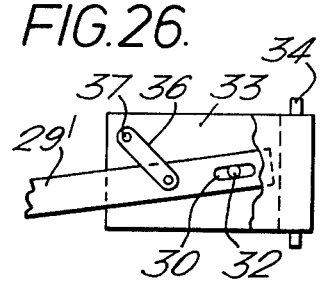
FIG. 26 is a side view of yet another form of variable length linkage.

FIG. 26 shows a linkage 21 in which the link 29 is connected to a link 36 pivoted at 37 to the member 33, the pin 32 again engaging in the slot 30.

Figure 27:
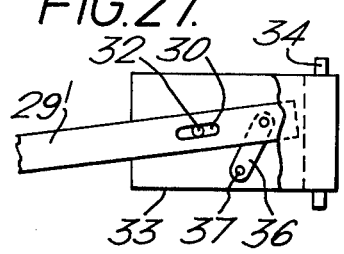
FIG. 27 is a side view of even yet another form of variable length linkage.

FIG. 27 is an embodiment of a linkage 21 similar to that of FIG. 29 but showing an alternative positioning of the link 36 and slot 30.

It will be appreciated that there are many more modified arrangements which can be devised which are not shown but which fall within the scope of the present invention.

All of the embodiments described so far are capable of extracting energy from the heave motion of a wave. However a wave also has surge energy and the particles of water within a wave have energy due to the relative movement of the particles from the surface of the water, this latter energy being hereafter referred to as pitch energy. Consequently, in order to increase the efficiency of apparatus for extracting energy from a wave, the apparatus should be capable of extracting energy from heave motion, surge motion and from the relative movement of water particles within the wave. When the previously described embodiments are provided with a reflector member 26 then they will extract energy also from surge motion.

Figure 30:
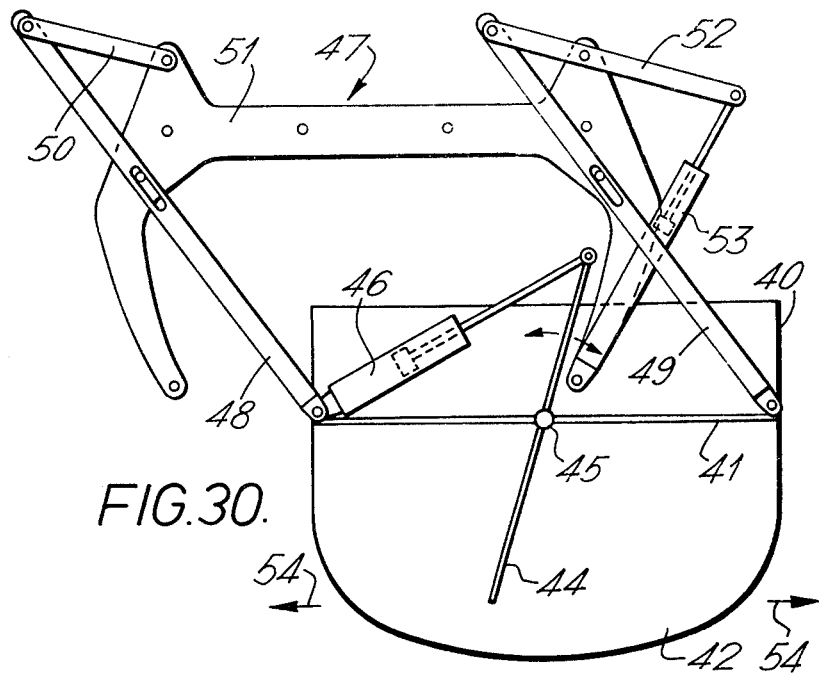
FIG. 30 is a diagrammatic side view of a buoyant member showing part of the lever and linkage system.
Figure 31:
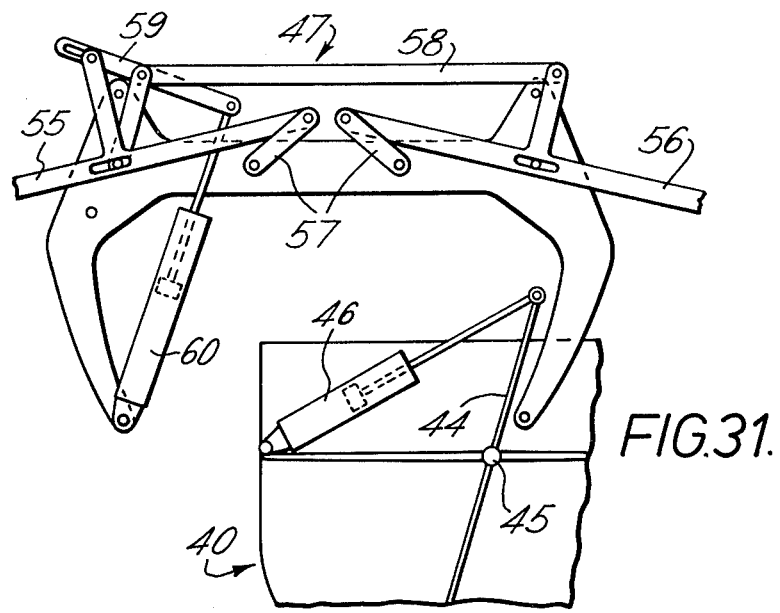
FIG. 31 is a view similar to that of FIG. 30 showing the part of the lever and linkage system interconnecting the buoyant members.

FIG. 28 shows diagrammatically an apparatus which is capable of extracting energy from each of the above mentioned motions of a wave. The apparatus consists of a plurality of buoyant units 40 arranged in a row. Each unit 40 as shown in FIG. 29 consists of a plate 41 extending between and fixed to buoyant side walls 42. Pivotably connected to the end walls 42 and extending therebetween is a plate 44 which can move about pivot 45. The plate 44 is connected to a hydraulic or pneumatic pulse transmitter 46 (FIG. 30) which is mounted on the buoyant unit 40. The plate 44 and transmitter 46 are used for extracting the pitch energy from the wave. Each unit 40 is connected by a linkage system 47 to the adjacent unit 40 and the linkage system 47 is shown more clearly in FIGS. 30 and 31. As shown in FIG. 30 the side walls 42 are connected to links 48 and 49. The link 48 is connected by a link 50 to a plate member 51 and the link 49 is connected to one end of a lever 52 which is pivoted intermediate its ends to the plate member 51 and has its other end connected to the rod of a pneumatic or hydraulic pulse transmitter device 53. Movement of the unit 40 in the direction of arrows 54 due to surge motion of a wave will actuate the device 53. The plate member 51 is connected to the plate members 51 of adjacent units 40 by links 55 and 56 (FIG. 31) which are connected by links 57 pivoted to the plate member 51. The links 55 and 56 are interconnected by a linkage 58 and the link 55 is connected to a lever 59 which is connected to a pneumatic or hydraulic device 60.

In use of the apparatus shown in FIGS. 28 to 31 the heave movements of a wave will cause the units 40 to move angularly relative to one another. As shown in FIG. 28 the upward heave motion will be a maximum at the crest of a wave and the downward heave motion will be a maximum at the trough of a wave. This heave movement will actuate the transmitter devices 60 of the apparatus. Surge movement of a wave is at a maximum at a position substantially mid-way between the crest and the trough of a wave and will be in two opposite directions. The surge movement will react on the plate 40 causing the unit 40 to be moved bodily first in one direction and then in the opposite direction, i.e., arrows 54 in FIG. 30. This movement will move the unit 40 relative to its plate member 51 and the linkages 48, 49, 50 and 52 will actuate the device 53. The movement of water particles within the wave will cause the plate 44 to move about its pivot 45 and the angular movement of the plate 44 will actuate the device 46.

In a modified form of the embodiment of FIGS. 28 and 29 the pivotable plate 44 is arranged to move bodily relative to the horizontal plate 41 and buoyant members 42 and at the same time be capable of pivoting.

The power of a wave is $LH^2$ and therefore the hydraulic or pneumatic devices need to be operated by a mechanism having substantially square law characteristics. The extraction of energy from heave power is improved by having the plates submerged.

In all of the embodiments described, each buoyant member 10, 40 may be of such large length, i.e., the distance between the outside surfaces of walls 12, 42, that it is necessary to provide intermediate walls for structural support.

The length of each buoyant member may be 200 feet. This may entail dividing the plates 11, 41, 44 into a plurality of sections.

I, therefore, particularly point out and distinctly claim as my invention:

1. Apparatus for extracting energy from movement of water, comprising a plurality of buoyant members, means for interconnecting said buoyant members one with another so that they are movable relative to one another, a plate member being provided on each buoyant member, said plate member being supported from the buoyant member and positioned so as to be submerged below the level of the water in use of the apparatus so that movememnt of water over the plate member reacts on said plate member and energy is transmitted therefrom to the buoyant members to increase said relative movement of the buoyant members, said plate member extending beyond the buoyant member, and means for converting the relative movement of the buoyant members into useful energy.

2. Apparatus as claimed in claim 1, wherein the buoyant members are arranged in a row in the direction of wave movement of the water.

3. Apparatus as claimed in claim 1, wherein at least some of the buoyant members comprises a pair of buoyant side walls interconnected by said plate member.

4. Apparatus as claimed in claim 1, wherein at least some of the buoyant members comprises a pair of buoyant side walls interconnected by said plate member, and the side walls have outwardly curved sides.

5. Apparatus as claimed in claim 1, wherein there are two spaced apart plate members.

6. Apparatus as claimed in claim 1, wherein at least some of the buoyant members has a single buoyant wall member extending from the plate member.

7. Apparatus as claimed in claim 1, wherein the operation of the means for converting movement into useful energy has a substantially square law characteristic.

8. Apparatus as claimed in claim 1, wherein each of said means for converting movement into useful energy comprises a hydraulic or pneumatic device or devices for producing pressure pulses in response to said movement and for transmitting the pulses to means from which the pulse energy can be extracted for use.

9. Apparatus as claimed in claim 1, wherein the plate member is pivotably connected to the buoyant member, means being provided for converting movement of the plate member relative to the buoyant member into useful energy.

10. Apparatus as claimed in claim 1, wherein a row of said buoyant members is provided at one end with a reflector member for reflecting a wave in the reverse direction.

11. Apparatus as claimed in claim 1, wherein a row of said buoyant members is provided at one end with a reflector member for reflecting a wave in the reverse direction, said reflector member being pivotably connected to the end buoyant member so as to be movable relative thereto and means are provided for converting said relative movement into useful energy.

12. Apparatus as claimed in claim 1, wherein a row of said buoyant members is provided at one end with a reflector member for reflecting a wave in the reverse direction, said reflector member consisting of a plate which in use extends beneath the surface of the water and buoyancy means for supporting the plate.

13. Apparatus as claimed in claim 1, wherein the buoyant members are interconnected by a variable length linkage.

14. Apparatus as claimed in claim 1, wherein a plurality of buoyant members are interconnected by a triangulation of variable length linkages.

15. Apparatus as claimed in claim 1, wherein each buoyant member is provided with an angularly movable plate extending normal to said plate member, said angularly movable plate being connected to means for converting the angular movement of the plate into useful energy.

16. Apparatus as claimed in claim 1, wherein each buoyant member is provided with an angularly movable plate extending normal to said plate member, said angularly movable plate being connected to means for converting the angular movement of the plate into useful energy, said angularly movable plate being also bodily movable relative to said plate member, and means being provided for also converting said bodily movement into useful energy.

17. Apparatus as claimed in claim 1, wherein each buoyant member is provided with an angularly movable plate extending normal to said plate member, said angularly movable plate being connected to means for converting the angular movement of the plate into useful energy, said buoyant members being interconnected by linkages allowing the buoyant members to be moved by surge energy of water relative to a datum, means being provided for converting the surge movement of the buoyant members into useful energy.

18. Apparatus as claimed in claim 1, wherein said buoyant members are hinged one to another to form a row.

* * * * *